US008566904B2

(12) United States Patent
Pizano et al.

(10) Patent No.: US 8,566,904 B2
(45) Date of Patent: Oct. 22, 2013

(54) ENTERPRISE BIOMETRIC AUTHENTICATION SYSTEM FOR A WINDOWS BIOMETRIC FRAMEWORK

(75) Inventors: Erix Pizano, Tampa, FL (US); Joe Sass, Land O Lakes, FL (US); Byron Saunders, New Port Richey, FL (US); Nathan Going, New Port Richey, FL (US)

(73) Assignee: Ceelox Patents, LLC, Overland Park, KS (US)

( * ) Notice: Subject to any disclaimer, the term of this patent is extended or adjusted under 35 U.S.C. 154(b) by 0 days.

(21) Appl. No.: 12/964,990

(22) Filed: Dec. 10, 2010

(65) Prior Publication Data

US 2011/0145904 A1    Jun. 16, 2011

Related U.S. Application Data

(60) Provisional application No. 61/286,278, filed on Dec. 14, 2009.

(51) Int. Cl.
*G06F 21/00* (2013.01)

(52) U.S. Cl.
USPC ................. 726/2; 726/27; 713/155; 713/168

(58) Field of Classification Search
USPC ...................... 726/2, 5, 27; 713/155–159, 168
See application file for complete search history.

(56) References Cited

U.S. PATENT DOCUMENTS

| | | | |
|---|---|---|---|
| 2002/0010862 A1 | 1/2002 | Ebara | |
| 2002/0083012 A1* | 6/2002 | Bush et al. | 705/76 |
| 2007/0061272 A1* | 3/2007 | Delgrosso et al. | 705/76 |
| 2007/0198849 A1 | 8/2007 | Mozer | |
| 2009/0013252 A1* | 1/2009 | DeWitt | 715/716 |
| 2009/0293111 A1 | 11/2009 | Lai et al. | |

FOREIGN PATENT DOCUMENTS

EP    1777641 A1    4/2007

OTHER PUBLICATIONS

"Adapter" from Webopedia. Retrieved Mar. 30, 2012 from http://www.webopedia.com/TERM/A/adapter.html, pp. 1-3.*
Introduction to the Windows Biometric Framework (WBF), Guidelines for IHV, ISVs and OEMs, www.microsoft.com/whdc/device/input/smartcard/WBFIntro.mspx, Aug. 23, 2010, 12 pages, Microsoft Windows Corporation, 2010.

(Continued)

*Primary Examiner* — Lisa Lewis
(74) *Attorney, Agent, or Firm* — Hovey Williams LLP

(57) ABSTRACT

An enterprise biometric authentication system for use with a network of client computing devices, each client computing device executing Windows® 7 operating system with Windows® Biometric Framework components including a client biometric service and a client engine adapter, comprises a client engine wrapper and a server subsystem further including a server database, a server storage adapter, a server engine adapter, and a server component. The client engine wrapper resides on a client computing device and is operable to intercept requests from the client biometric service to the client engine adapter and to transmit the requests. The server storage adapter may store and retrieve biometric templates from the server database. The server engine adapter may generate and compare biometric templates. The server component may receive the requests from the client engine wrapper, forward the requests to the server engine adapter, and transmit results of the requests to the client engine wrapper.

14 Claims, 5 Drawing Sheets

(56) References Cited

OTHER PUBLICATIONS

Notification of Transmittal of the International Search Report and the Written Opinion of the International Searching Authority, or the Declaration dated Aug. 2, 2011, in corresponding International Patent Application No. PCT/US2010/059915; International filing date: Dec. 10, 2010; Applicant: Ceelox, Inc. et al.

* cited by examiner

ENTERPRISE BIOMETRIC AUTHENTICATION SYSTEM FOR A WINDOWS BIOMETRIC FRAMEWORK

RELATED APPLICATIONS

The present non-provisional application claims priority benefit, with regard to all common subject matter, to U.S. Provisional Patent Application No. 61/286,278, entitled "ENTERPRISE BIOMETRIC AUTHENTICATION SYSTEM", filed Dec. 14, 2009, which is incorporated by reference into the present application in its entirety.

BACKGROUND OF THE INVENTION

1. Field of the Invention

The present invention relates to authentication methods for computing devices. More particularly, the invention relates to biometric authentication for computing devices over a communications network.

2. Description of the Related Art

Networks of computing devices, wherein each computing device has Windows® 7 as an operating system, may utilize the Windows Biometric Framework (WBF) to implement a biometric authentication system on each computing device. In operation of the biometric authentication system on a given computing device, a user may provide a live sample via a biometric sensor, such as swiping his finger on a fingerprint scanner. The live sample may be used to generate a biometric template that is compared to a biometric template associated with the user and already stored on the computing device. If the templates match, then the user is authenticated and is allowed access to secure resources on the computing device or other devices on the network. However, with Windows® 7 that utilizes the WBF, the biometric authentication system on each computing device is functional only on that device, such that a user enrolled to access secure resources through a first computing device may not access the resources through a second device without re-enrolling on the second device. Likewise for all other computing devices on the network.

SUMMARY OF THE INVENTION

Embodiments of the present invention solve the above-mentioned problems and provide a distinct advance in the art of biometric authentication systems. More particularly, embodiments of the invention provide a system and methods for enterprise biometric authentication on a network of computing devices that each implement Windows® 7 operating system that includes Windows® Biometric Framework (WBF) components. The current invention provides for the WBF to be distributed across a network.

Various embodiments of the enterprise biometric authentication system comprise a client engine wrapper and a server subsystem further including a server database, a server storage adapter, a server engine adapter, and a server component. The client engine wrapper resides on a client computing device and is operable to intercept requests from the client biometric service, a component of the WBF, to the client engine adapter, a component of the WBF, and to transmit the requests to the server subsystem. The server storage adapter may store and retrieve biometric templates from the server database. The server engine adapter may generate and compare biometric templates. The server component may receive the requests from the client engine wrapper, forward the requests to the server engine adapter, and transmit results of the requests to the client engine wrapper.

Various embodiments of a method for authenticating a user to be implemented with a network of client computing devices, each client computing device executing Windows® 7 operating system with WBF components including a client biometric service and a client engine adapter, comprise the steps of: receiving an authentication request including user data with a client engine wrapper from the client biometric service intended for the client engine adapter, determining whether a server component is available with the client engine wrapper, transmitting the request to the server component from the client engine wrapper if the server component is available, retrieving a stored biometric template associated with the user data from a server database, performing an authentication with a server engine adapter, transmitting an authentication result to the client engine wrapper, retrieving a stored biometric template associated with the user data from a client database if the server component is not available, and performing an authentication with the client engine adapter.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
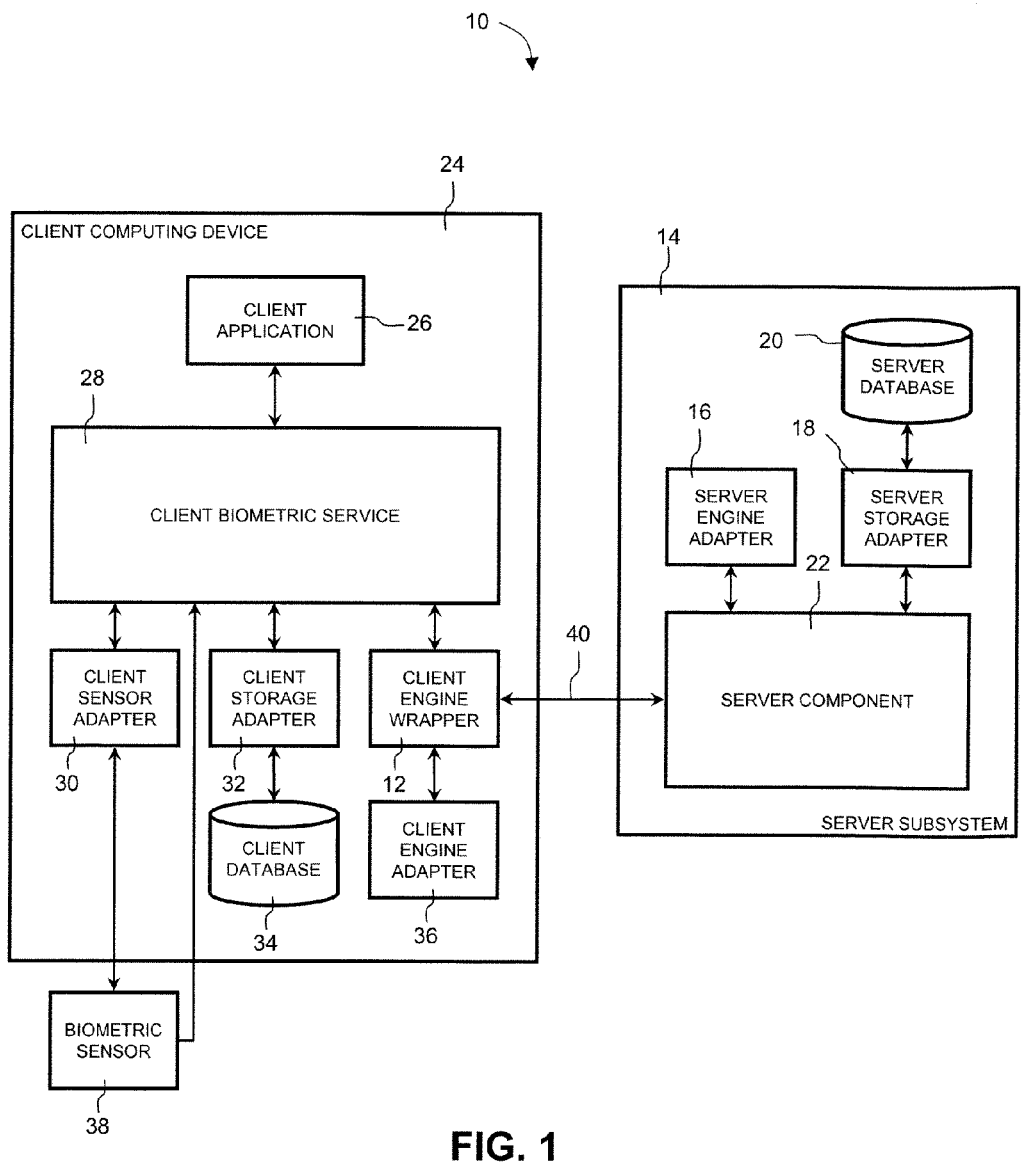
FIG. 1 is a schematic block diagram of an enterprise biometric security system constructed in accordance with various embodiments of the current invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An enterprise biometric authentication system 10, constructed in accordance with various embodiments of the present invention, is shown in FIG. 1. The system 10 broadly comprises a client engine wrapper 12 and a server subsystem 14, which further includes a server engine adapter 16, a server storage adapter 18, a server database 20, and a server component 22. The enterprise biometric authentication system 10 may be implemented in hardware, software, firmware, or a combination thereof, and may be configured to work with and adapt a plurality of stand-alone biometric authentication systems to allow biometric authentication across a network.

In various embodiments, the components of the enterprise biometric authentication system 10 may be implemented as software programs or processor-executable code segments that may be stored on a computer-readable medium. In the context of this application, a "computer-readable medium" can be any device that can contain, or store the program for use by or in connection with the instruction execution system, apparatus, or device. The computer-readable medium can be, for example, but not limited to, an electronic, magnetic, optical, electro-magnetic, or semi-conductor system, apparatus, or device. More specific, although not inclusive, examples of the computer-readable medium would include the following: a portable computer diskette, a hard drive, a random access memory (RAM), a read-only memory (ROM), an erasable, programmable, read-only memory (EPROM or Flash memory), a portable compact disk read-only memory (CDROM), a digital video disc (DVD), a Blu-Ray™ disc, and the like.

Networks of computing devices, wherein each computing device has Windows® 7, from Microsoft, Inc. in Redmond, Wash., as an operating system, may utilize the Windows Biometric Framework (WBF) to implement a biometric authentication system on each computing device. In operation of the biometric authentication system on a given computing device, a user may provide a live sample via a biometric sensor, such as swiping his finger on a fingerprint scanner. The live sample may be used to generate a biometric template that is compared to a biometric template associated with the user that is already stored on the computing device, also known as an enrolled or stored template. If the templates match, then the user is authenticated and is allowed to gain access to secure resources on the computing device or other devices on the network. However, with Windows® 7 utilizing the WBF, the biometric authentication system on each computing device is functional only on that device, such that a user enrolled to access secure resources through a first computing device may not access the resources through a second device without re-enrolling on the second device. Likewise for all other computing devices on the network.

The enterprise biometric authentication system 10 allows a user to access secure resources through any Windows® 7 computing device after enrolling only once. The client engine wrapper 12 may be installed on or accessed by every computing device on the network to interface with the WBF on each device. The server subsystem 14 may be installed on or accessed by just one computing device on the network. In some embodiments, the computing device on which the server subsystem 14 resides may be a device that includes a biometric sensor and biometric authentication system. In other embodiments, the server subsystem 14 may reside on a computing device that does not include a biometric sensor and biometric authentication system. Furthermore, in various embodiments, there may be multiple server subsystems 14 that act as backups or redundancies to the main server subsystem 14.

An example of the computing device is a client computing device 24, as shown in FIG. 1. The client computing device 24 generally comprises any device that is capable of running an operating system and executing software applications, such as a workstation, a desktop computer, a laptop computer, a notebook computer, a palmtop computer, and the like. The client computing device 24 may also include mobile devices including wireless communication devices. The client computing device 24 generally also includes data processing circuitry coupled with memory components to execute computer code or software such as processors, microprocessors, multi-core microprocessors, microcontrollers, combinations thereof, and the like.

In various embodiments, the client computing device 24 runs the Windows® 7 operating system and may also include or be able to access a client application 26, and the WBF components, including a client biometric service 28, a client sensor adapter 30, a client storage adapter 32, a client database 34, and a client engine adapter 36. In addition, a biometric sensor 38 may be in communication with the client computing device 24.

The client sensor adapter 30, the client storage adapter 32, and the client engine adapter 36 may communicate with each other and the client application 26 through the client biometric service 28 in accordance with the Windows® 7 WBF architecture. In combination, these components may allow the user to perform authentication as well as manage biometric templates.

The client application 26 may be a computer program with which the user interfaces that requires access to biometric data. In some embodiments, the client application 26 may be a program that the user initiates or executes himself. In other embodiments, the client application 26 may be automatically run by the client computing device 24. The client application 26 may be a program that requests biometric authentication to allow access to secure resources, such as a system login screen to allow the user system access, an email reader to allow the user to view email, a file viewer to allow the user to access secure documents, a web browser to allow the user access to secure information, and the like. The client application 26 may also be a program that allows the user to manage biometric templates, such as enrolling another user or removing templates of users who are no longer allowed access to secure resources. The client application 26 may include a window with standard user interface components such as list boxes, pull-down menus, popup windows, buttons, scroll bars, and the like.

The client biometric service 28 may be a software component that runs as a provided service of the Windows® 7 operating system. The client biometric service 28 may include an application programming interface (API) that interacts with one or more client applications 26, and a biometric service provider (BSP) that interacts with the client sensor adapter 30, the client storage adapter 32, and the client engine adapter 36. The client biometric service 28 may receive requests from the client application 26 for authentication or biometric template management and may direct the request to the client sensor adapter 30, the client storage adapter 32, or the client engine adapter 36, or combinations thereof. The client biometric service 28 may also receive requests or data in response to other requests from one or more of the client sensor adapter 30, the client storage adapter 32, or the client engine adapter 36, and may direct the requests or data to the appropriate destination.

The client sensor adapter 30 may be a software component executed on or accessible by the client computing device 24 that schedules or controls the operation of the biometric sensor 38. For example, the client sensor adapter 30 may instruct the biometric sensor 38 to perform a biometric scan and send the captured live sample to the client biometric service 28. The client sensor adapter 30 may translate requests and commands from the client biometric service 28 into instructions for a particular biometric sensor. Thus, the client sensor adapter 30 may include an adapter for each specific biometric sensor that is coupled to the client computing device 24. Typically, the client sensor adapter 30 is supplied by the manufacturer of the biometric sensor 38.

The client storage adapter 32 may be a software component executed on or accessible by the client computing device 24 that receives and responds to requests from the client biometric service 28 for biometric template data utilizing, at least in part, the client database 34. For example, the client storage adapter 32 may store biometric templates in the client database 34 and may retrieve biometric templates from the client database 34. Generally, the biometric templates for storage and retrieval are passed through the client biometric service 28. The biometric templates may be associated with user data such as a username, password, user-identifier, or other data relating to a user. Thus, the request for biometric template data may include user data as a reference. Typically, the client storage adapter 32 is supplied by the manufacturer of the biometric sensor 38.

The client database 34 may be a repository to store and retrieve biometric templates on the client computing device 24. The client database 34 may be a text database, relational database, hierarchical database, a collection of files, or other database capable of storing and retrieving data. In various embodiments, the client database 34 may be a SQLite database or a Microsoft® SQL Server® database. The client database 34 is generally managed by the client storage adapter 32, which may send data to and receive data from the client database 34.

The client engine adapter 36 may be a software component executed on or accessible by the client computing device 24 that generally functions only when the client engine wrapper 12 cannot access the server subsystem 14. Otherwise, the client engine wrapper 12 intercepts and handles all requests that are intended for the client engine adapter 36, as described in more detail below.

The client engine adapter 36 receives and responds to requests to perform biometric data processing, including authentication and enrollment. The authentication request may include verification or identification, as discussed below. The request may include user data and biometric indicia, among other information such as the biometric sensor 38 identification or a specified engine adapter, and the like. The biometric indicia may include a recently-captured live sample or a biometric template generated by the biometric sensor 38 or other software components on the client computing device 24.

The client engine adapter 36 may generate a captured biometric template from a live sample captured on the biometric sensor 38. The client engine adapter 36 may also perform biometric template matching during authentication operations. In various embodiments, the client engine adapter 36 may further perform biometric data normalization and feature extraction.

When performing an authentication operation, if the biometric indicia of the request includes a live sample, then the client engine adapter 36 may generate a captured biometric template from the sample. If the request is for verification, then the client engine adapter 36 may request a stored biometric template associated with the user data from the client storage adapter 32 to be retrieved from the client database 34. The client engine adapter 36 may then compare the captured biometric template with the stored biometric template. The comparison may generate a binary success or failure result, a numeric value of the correlation, or a combination thereof. If the request is for identification, then the client engine adapter 36 may request all stored biometric templates from the client storage adapter 32. The client engine adapter 36 may then compare the captured biometric template with each of the stored biometric templates. The comparison may generate a binary success or failure result, a numeric value of the correlation, or a combination thereof for each stored biometric template. The result of the comparison may be reported back to the client application 26 through the client biometric service 28.

If the biometric indicia of the request includes a biometric template generated elsewhere, and if the request is for verification, then the client engine adapter 36 may request a stored biometric template associated with the user data from the client storage adapter 32, perform the comparison, and generate the result. If the request is for identification, then the client engine adapter 36 may request all stored biometric templates from the client storage adapter 32 and compare the captured biometric template with each of the stored templates. The result of the comparison for all of the templates may be reported back to the client application 26 through the client biometric service 28.

When performing an enrollment operation, if the biometric indicia of the request includes a live sample, then the client engine adapter 36 may generate a biometric template from the sample and forward the biometric template to the client storage adapter 32 to be stored in the client database 34. If the biometric indicia of the request includes a biometric template generated elsewhere, then the client engine adapter 36 may simply forward the biometric template to the client storage adapter 32 to be stored in the client database 34.

The client engine adapter 36 may include various software or firmware algorithms, or may have access to hardware accelerators, in order to perform the biometric data processing. Typically, the client engine adapter 36 is supplied by the manufacturer of the biometric sensor 38.

The biometric sensor 38 generally scans or otherwise senses a live sample from a user and transfers the captured live sample to the client computing device 24. The biometric sensor 38 may include a port, such as a window, to receive biometric components, such as a user's finger, hand, iris, DNA, or the like. In various embodiments, the biometric sensor 38 may also include hardware, software, or firmware components, or combinations thereof, capable of generating a biometric template from the captured live sample. The biometric sensor 38 may be a standalone unit in communication with the client computing device 24 or may be integrated with the client computing device 24. Exemplary manufacturers of biometric sensors include AuthenTec of Melbourne, Fla. and Validity Sensors, Inc. of San Jose, Calif. Generally, the biometric sensor 38 is instructed to perform a scan by the client sensor adapter 30, and the captured biometric indicia may be transmitted to the client biometric service 28.

The client engine wrapper 12 may be a software component executed on or accessible by the client computing device 24 that intercepts requests to perform biometric data processing intended for the client engine adapter 36. The client engine wrapper 12 intercepts the requests from the client biometric service 28 and sends the requests to the server subsystem 14. If the server subsystem 14 is not available, then the client engine wrapper 12 acts transparent, allowing requests to pass through to the client engine adapter 36 and returning responses from the client engine adapter 36. Thus, in such a situation, the client engine adapter 36 functions normally, as described above.

The client engine wrapper 12 may include network communications components or subcomponents that allow the client engine wrapper 12 to send and receive data over a network, such as a local area network (LAN), a metro area network (MAN), or a wide area network (WAN) with a variety of topologies, protocols, and architectures. The client engine wrapper 12 may be also be able to encrypt and decrypt data using the Advanced Encryption Standard (AES)-256 algorithm and to transmit and receive data using network sockets or other communication mechanisms.

To function, the client engine wrapper 12 may appear to the operating system of the client computing device 24 as an engine adapter. The client engine wrapper 12 may be entered in allocation tables, configuration files, the data registry, or the like as the client engine adapter 36, so that the operating system and components like the client biometric service 28 recognize the client engine wrapper 12 as the client engine adapter 36. In addition, the client engine wrapper 12 appears as the client biometric service 28 to the client engine adapter 36.

The client engine wrapper 12 may communicate with the server subsystem 14 through a network connection 40, as shown in FIG. 1. The network connection 40 may include any cluster of computing devices in communication with each other and/or with a server computing device, and may further include cloud connections, such as the Internet. The network connection 40 may be wired including metal conductive cables, such coax or twisted pair, optical media, such as optical fibers, or combinations thereof. The network connection 40 may also be wireless and may utilize radio frequency (RF) communication standards, such as the Institute of Electrical and Electronics Engineers (IEEE) 802.11 standards.

The server subsystem 14 and it components may be installed on or accessed by any processor-based computing device that has the network connection 40 such that the server subsystem 14 is operable to communicate with the client engine wrapper 12. The computing device on which the server subsystem 14 is installed may be substantially similar to the client computing device 24. In some embodiments, the server subsystem 14 may be installed on a client computing device 24.

The server engine adapter 16, the server storage adapter 18, and the server database 20 may be substantially similar to the client engine adapter 36, the client storage adapter 32, and the client database 34, respectively. Generally, the server engine adapter 16 performs the role of the client engine adapter 36 described above when the server subsystem 14 is unavailable. Within the network of client computing devices 24, there may be a plurality of different client engine adapters 36 in use, as provided by or specified by the biometric sensor 38 manufacturer. Therefore, in some embodiments, the server subsystem 14 may include a plurality of server engine adapters 16 in order to be compatible with the biometric sensors 38 of all the client computing devices 24. In other embodiments, the server subsystem 14 may include a generic or general purpose server engine adapter 16 that is compatible with a variety of biometric sensors 38.

The server storage adapter 18 may store and retrieve biometric templates from the server database 20, which retains the biometric templates. Typically, the server database 20 retains the biometric templates of all the users who have been granted access to secure resources, whereas each client database 34 generally retains the biometric templates of only those users who have utilized that particular client computing device 24 to access secure resources.

The server component 22 may be a software program that receives requests from the client engine wrapper 12 to process biometric data and transmits results from the server subsystem 14 operations to the client engine wrapper 12. The server component 22 may parse the request in order to distribute the request to the appropriate server engine adapter 16, if the server subsystem 14 includes more than one server engine adapter 16. In addition, the server component 22 may process at least a portion of some requests. In various embodiments, the server component 22 may perform functions similar to those of the client biometric service 28.

After requests have been handled by the server engine adapter 16, the server component 22 may return the results of the operations to the client engine wrapper 12. In addition, the server component 22 may transmit the biometric template associated with the user data to the client engine wrapper 12.

Like the client engine wrapper 12, the server component 22 may include network communications components or subcomponents to send and receive data over a network, as well as components that are operable to encrypt and decrypt data. In various embodiments, all communication between the server component 22 and the client engine wrapper 12 may be encrypted.

The enterprise biometric authentication system 10 may operate as follows. The client engine wrapper 12 may be installed on or made accessible to each network-connected client computing device 24 that runs the Windows® 7 operating system and includes Windows® Biometric Framework components of the client biometric service 28, the client sensor adapter 30, the client storage adapter 32, the client database 34, and the client engine adapter 36, along with the client application 26, as shown in FIG. 1. On each client computing device 24, in the registry set, allocation tables, configuration files, or the like, the client engine wrapper 12 may be identified as the client engine adapter 36. The server subsystem 14 may be installed on any computing device in the network, including a client computing device 24.

A user may utilize any client computing device 24 to perform biometric data operations, such as new user enrollment, biometric authentication, and the like. The user may execute the client application in order to manage biometric templates or to perform an authentication for gaining access to secured resources. The client application 26 may instruct the user to provide a live sample such as by allowing the biometric sensor 38 to scan one or more fingers. Other forms of biometric data may be presented as well, such as a user's iris, DNA, etc. The client application 26 may also send a request through the client biometric service 28 to the client sensor adapter 30 to instruct the biometric sensor 38 to perform a biometric scan. The captured biometric indicia may be communicated from the biometric sensor 38 to the client biometric service 28. The user may also be instructed to enter user data, such as a user name and a password.

The client biometric service 28 may forward a request for authentication or enrollment to the client engine adapter 36. The request may include user data, biometric indicia, and other information such as a specified engine adapter. However, the client engine wrapper 12 may receive the request instead of the client engine adapter 36. The client engine wrapper 12 may try to establish communication with the server subsystem 14. If the server subsystem 14 is available, then the client engine wrapper 12 may transmit the request to the server subsystem 14. The server component 22 may receive the transmitted information.

The server component 22 may parse the request, if necessary, to determine which server engine adapter 16 receives the request, and may send the request to the appropriate server engine adapter 16.

When responding to an authentication request, if the biometric indicia of the request includes a live sample, and if verification is requested, then the server engine adapter 16 may generate a captured biometric template from the sample and request a stored biometric template associated with the user data from the server storage adapter 18 to be retrieved from the server database 20. The server engine adapter 16 may then compare the captured biometric template with the stored biometric template. The comparison may generate a binary success or failure result, a numeric value of the correlation, or a combination thereof. If identification is requested, then the server engine adapter 16 may generate a captured biometric template from the sample and request all of the biometric templates stored in the server database 20. The server engine adapter 16 may compare the captured biometric template with each of the stored biometric templates. The result of the comparison may be reported back to the server component 22, which, in turn, may forward the result to the client engine wrapper 12.

If the biometric indicia of the request includes a biometric template generated elsewhere, and if verification is requested, then the server engine adapter 16 may request a stored biometric template associated with the user data from the server storage adapter 18, perform the comparison, and generate the result. If identification is requested, then the server engine adapter 16 may request all of the biometric templates stored in the server database 20. The server engine adapter 16 may compare the captured biometric template with each of the stored biometric templates. The result of the comparison may be reported back to the server component 22, which, in turn, may forward the result to the client engine wrapper 12.

When responding to an enrollment request, if the biometric indicia of the request includes a live sample, then the server engine adapter 16 may generate a biometric template from the sample and forward the biometric template to the server storage adapter 18 to be stored in the server database 20. If the biometric indicia of the request includes a biometric template generated elsewhere, then the server engine adapter 16 may simply forward the biometric template to the server storage adapter 18 to be stored in the server database 20.

After responding to either request, the server engine adapter 16 may forward the stored biometric template associated with the user data to the server component 22 to be transmitted to the client engine wrapper 12, which may send the biometric template to the client storage adapter 32 to be stored in the client database 34. Thus, the client database 34 may have a copy of the user's biometric template for authentication purposes in case the client engine wrapper 12 is unable to communicate with the server subsystem 14, as discussed in more detail below.

If the client engine wrapper 12 is unable to establish communication with the server subsystem 14, then the Windows® Biometric Framework components on the client computing device 24 may function as they would without the enterprise biometric authentication system 10 in place. The client engine wrapper 12 may transparently pass requests from the client biometric service 28 to the client engine adapter 36 for normal processing. The client engine wrapper 12 may also pass the results of the requests from the client engine adapter 36 to the client biometric service 28.

There may be some situations in which the client engine wrapper 12 does not forward an enrollment request to the server subsystem 14, even if the server subsystem 14 is available. For example, it may be desired to perform the enrollment quickly or perhaps to cut down on network traffic since enrollment may require multiple scans of life samples. In such situations, the client engine wrapper 12 may forward an enrollment request to the client engine adapter 36, instead of the server component 22. After the client engine adapter 36 generates a biometric template or verifies that it has received a biometric template, the client engine adapter 36 may transfer the biometric template to the client engine wrapper 12. At this point, the client engine wrapper 12 may forward the biometric template to both the client storage adapter 32 (through the client biometric service 28) and the server component 22, which in turn may transfer the biometric template to the server storage adapter 18.

There may be additional situations in which the client engine wrapper 12 does not forward an enrollment request to the server subsystem 14, even if the server subsystem 14 is available. For example, it may be necessary to consolidate the client database 34 and the server database 20. The client engine wrapper 12 may forward an enrollment request to the client engine adapter 36 and may receive the biometric template back from the client engine adapter 36. The client engine wrapper 12 may forward the biometric template to the client storage adapter 32 and may also request all of the biometric templates from the client database 34. The client engine wrapper 12 may receive the biometric templates and forward them to the server subsystem 14. The server component 22 may then forward the biometric templates to the server storage adapter 18 for storage on the server database 20. In various embodiments, the server engine adapter 16 may determine the scan date for each of the biometric templates so that the most recent biometric template for each user is stored in the server database 20.

Under normal circumstances, the server subsystem 14 is available to receive requests from all of the client computing devices 24. However, if the server subsystem 14 is unavailable, then the client computing devices 24 can still authenticate users in a standalone mode with the drawback being that users new to a particular client computing device 24 may have to re-enroll in order to gain access to secure resources.

Figure 2:
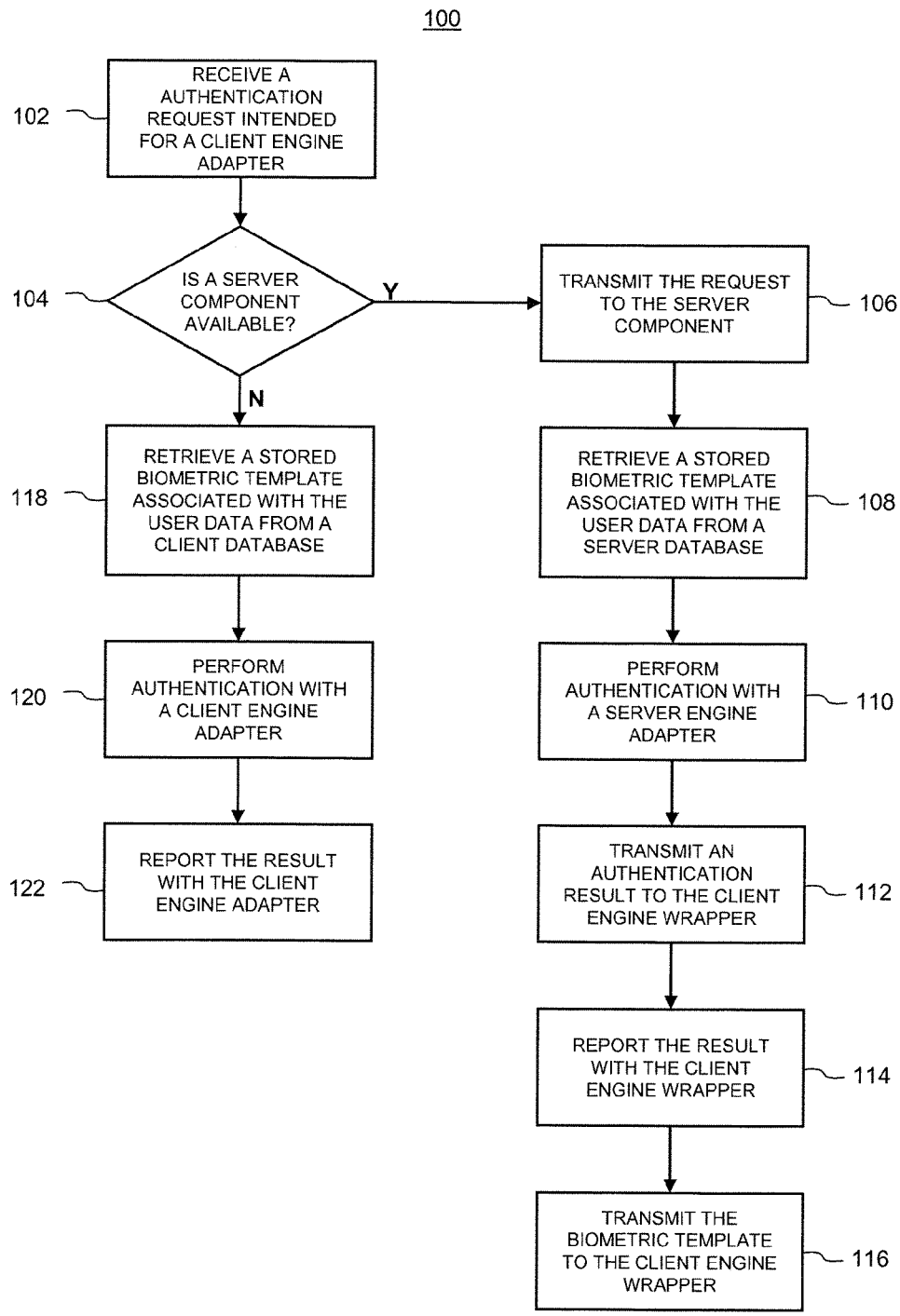
FIG. 2 is a flow diagram of at least some steps of a method for authenticating a user using the enterprise biometric authentication system.

Steps of a method 100 for authenticating a user utilizing the enterprise biometric authentication system 10 with a network of client computing devices 24 that are executing the Windows® 7 operating system including the Windows® Biometric Framework (WBF) in accordance with various embodiments of the present invention are illustrated in FIG. 2. The steps may be performed in the order shown in FIG. 2, or they may be performed in a different order. Furthermore, some steps may be performed concurrently as opposed to sequentially. In addition, some steps may be optional.

Referring to step 102, an authentication request is received that is intended for a client engine adapter 36. The client engine adapter 36 may be installed or accessible by the client computing device 24 as part of the WBF, which also includes a client biometric service 28. The request may be transmitted by the client biometric service 28 and received by a client engine wrapper 12. The request may include user data, biometric indicia, and other information such as a specified engine adapter.

Referring to step 104, the client engine wrapper 12 determines if a server component 22 is available. The server component 22 may be part of a server subsystem 14 that resides on a computing device that is accessible through the network. Thus, the client engine wrapper 12 sends a communication to the server component 22 through the network.

Referring to step 106, if the server component 22 responds, then the client engine wrapper 12 transmits the request to the server component 22. The server subsystem 14 may include one or more server engine adapters 16. The server component 22 may parse the request to determine which server engine adapter 16 receives the request and may forward the request thereto.

Referring to step 108, a stored biometric template associated with the user data is retrieved from a server database 20. The server engine adapter 16 may send a request to a server storage adapter 18 to retrieve the biometric template stored in the server database 20.

Referring to step 110, an authentication is performed with the server engine adapter 16. If the biometric indicia of the request includes a live sample, then the server engine adapter 16 may generate a captured biometric template from the sample and compare the captured biometric template with the stored biometric template. The comparison may generate a binary success or failure result, a numeric value of the correlation, or a combination thereof.

Referring to step 112, the authentication result is transmitted to the client engine wrapper 12. The result may first be passed to the server component 22 which then transmits the result.

Referring to step 114, the result is reported to the client biometric service 28 from the client engine wrapper 12. The client biometric service 28 may then send the result to the client application 26.

Referring to step 116, the biometric template associated with the user data is transmitted to the client engine wrapper 12 from the server component 22. The biometric template may then be forwarded to the client storage adapter 32 for storage in the client database 34.

Referring to step 118, if the server component 22 is not available, then a stored biometric template associated with the user data is retrieved from a client database 34. When the server component 22 is unavailable, the client engine wrapper 12 acts transparent and allows requests to pass from the client biometric service 28 to the client engine adapter 36. The client engine adapter 36 may send a request to a client storage adapter 32 to retrieve the biometric template stored in the client database 34.

Referring to step 120, an authentication is performed with the client engine adapter 36. If the biometric indicia of the request includes a live sample, then the client engine adapter 36 may generate a captured biometric template from the sample and compare the captured biometric template with the stored biometric template. The comparison may generate a binary success or failure result, a numeric value of the correlation, or a combination thereof.

Referring to step 122, the result is reported to the client biometric service 28 from the client engine adapter 36. The result may pass through the client engine wrapper 12. The client biometric service 28 may then send the result to the client application 26.

Figure 3:
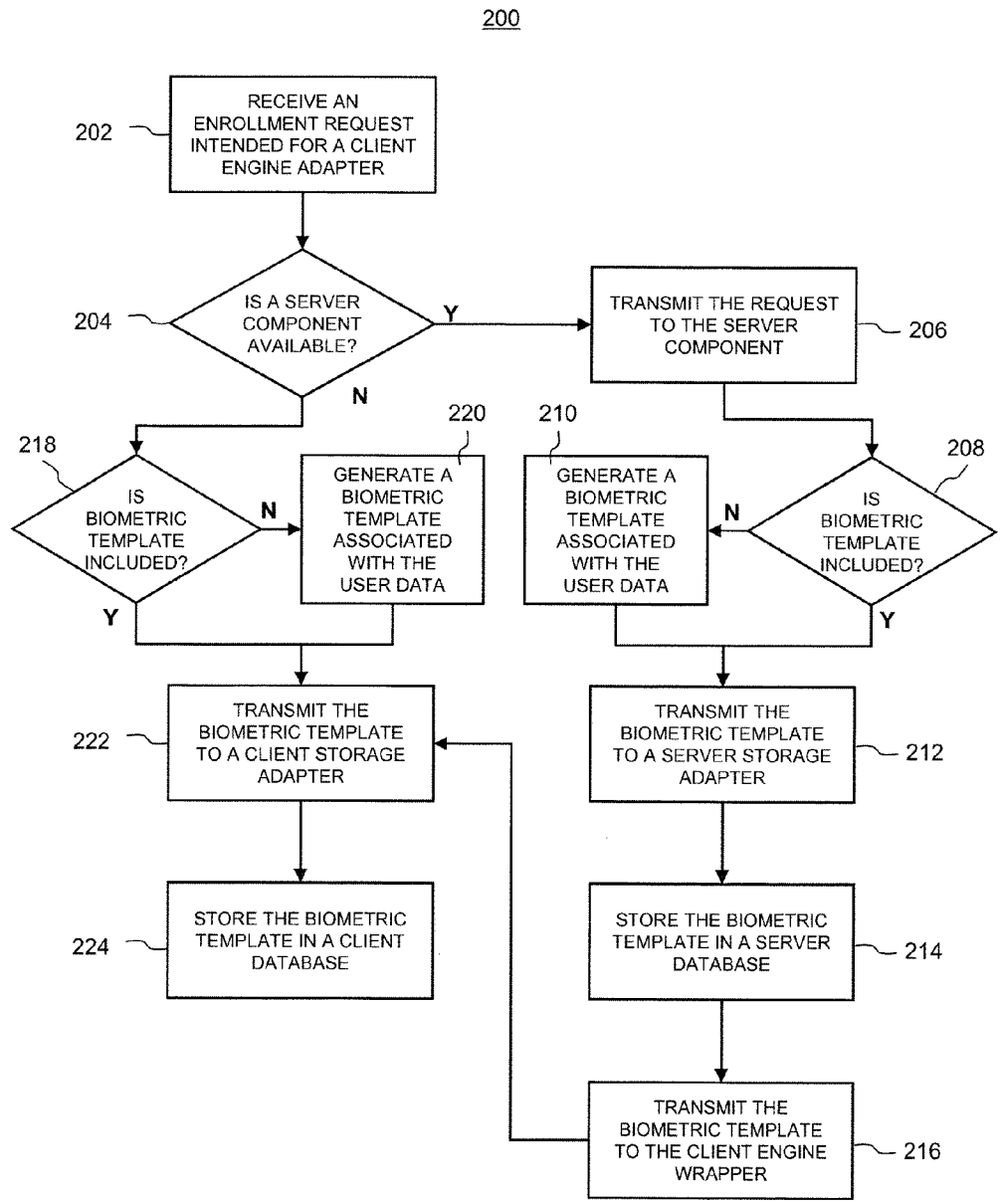
FIG. 3 is a flow diagram of at least some steps of a method for enrolling a user using the enterprise biometric authentication system.

Steps of a method 200 for enrolling a user utilizing the enterprise biometric authentication system 10 with a network of client computing devices 24 that are executing the Windows® 7 operating system including the Windows® Biometric Framework (WBF) in accordance with various embodiments of the present invention are illustrated in FIG. 3. The steps may be performed in the order shown in FIG. 3, or they may be performed in a different order. Furthermore, some steps may be performed concurrently as opposed to sequentially. In addition, some steps may be optional.

Referring to step 202, an enrollment request is received that is intended for a client engine adapter 36. The client engine adapter 36 may be installed or accessible by the client computing device 24 as part of the WBF, which also includes a client biometric service 28. The request may be transmitted by the client biometric service 28 and received by a client engine wrapper 12. The request may include user data, biometric indicia, and other information such as a specified engine adapter.

Referring to step 204, the client engine wrapper 12 determines if a server component 22 is available. The server component 22 may be part of a server subsystem 14 that resides on a computing device that is accessible through the network. Thus, the client engine wrapper 12 sends a communication to the server component 22 through the network.

Referring to step 206, if the server component 22 responds, then the client engine wrapper 12 transmits the request to the server component 22. The server subsystem 14 may include one or more server engine adapters 16. The server component 22 may parse the request to determine which server engine adapter 16 receives the request and may forward the request thereto.

Referring to step 208, the server engine adapter 16 determines if a biometric template is included in the request. The biometric template associated with the user data may be generated by a biometric sensor 38 or by other components accessible by the client computing device 24.

Referring to step 210, if the biometric template is not included in the request, then a biometric template associated with the user data is generated by the server engine adapter 16.

Referring to step 212, if the biometric template is included in the request, or if the biometric template has been generated by the server engine adapter 16, then the biometric template is transmitted to a server storage adapter 18.

Referring to step 214, the biometric template is stored in a server database 20, as initiated by the server storage adapter 18.

Referring to step 216, the biometric template is also transmitted to the client engine wrapper 12. The biometric template may be transmitted by the server component 22. The next step in the sequence may be step 222, discussed below.

Referring to step 218, if the server component 22 is not available, then the client engine adapter 36 determines if a biometric template is included in the request.

Referring to step 220, if the biometric template is not included in the request, then a biometric template associated with the user data is generated by the client engine adapter 36.

Referring to step 222, if the biometric template is included in the request, if the biometric template has been generated by the client engine adapter 36, or if the biometric template has been forwarded from the server component 22, then the biometric template is transmitted to a client storage adapter 32. The biometric template may be transmitted from the client engine wrapper 12.

Referring to step 224, the biometric template is stored in a client database 34, as initiated by the client storage adapter 32.

Figure 4:
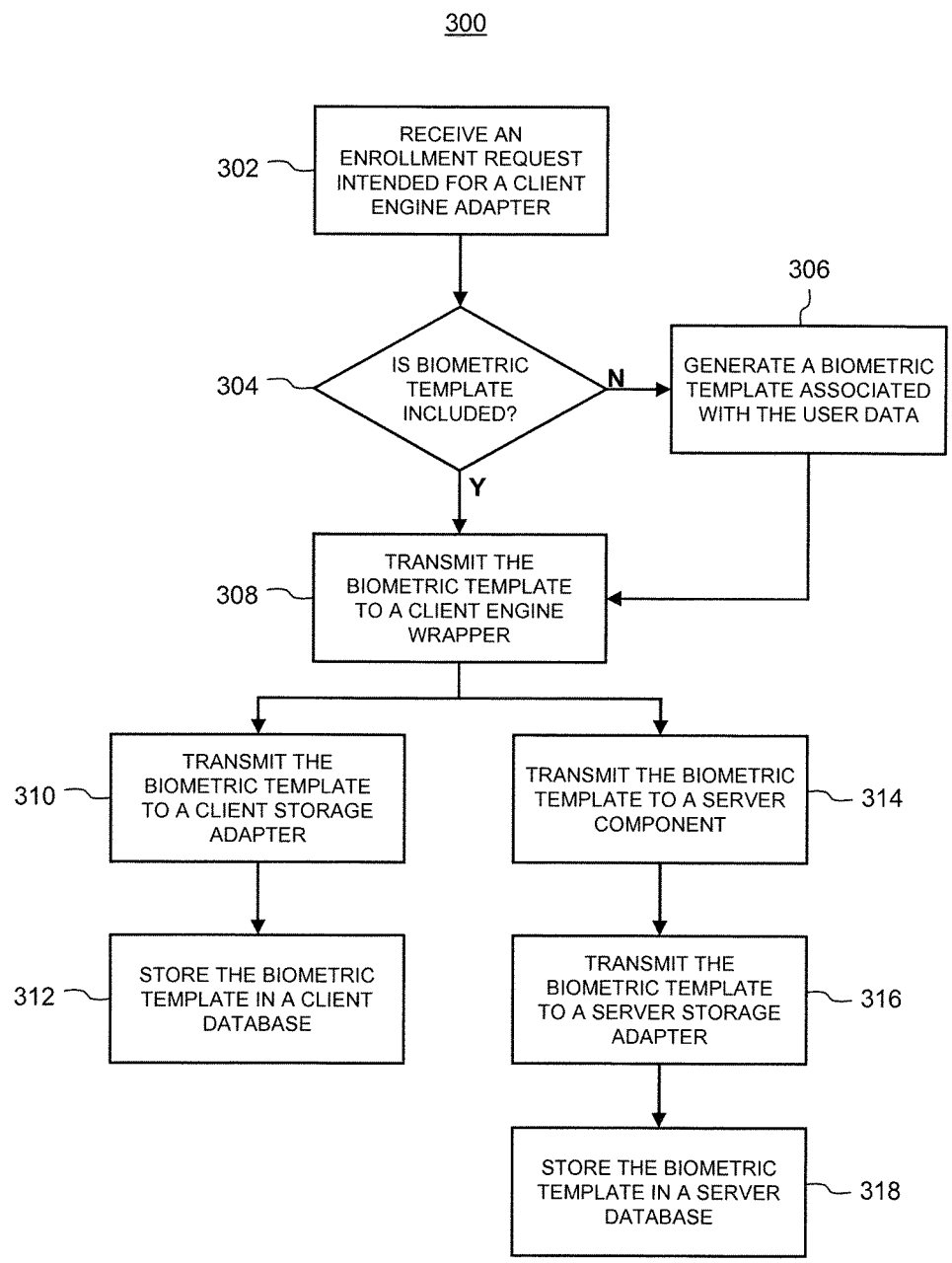
FIG. 4 is a flow diagram of at least some steps of a second method for enrolling a user using the enterprise biometric authentication system.

Steps of a second embodiment of a method 300 for enrolling a user utilizing the enterprise biometric authentication system 10 with a network of client computing devices 24 that are executing the Windows® 7 operating system including the Windows® Biometric Framework (WBF) in accordance with various embodiments of the present invention are illustrated in FIG. 4. The steps may be performed in the order shown in FIG. 4, or they may be performed in a different order. Furthermore, some steps may be performed concurrently as opposed to sequentially. In addition, some steps may be optional.

Referring to step 302, an enrollment request is received that is intended for a client engine adapter 36. The client engine adapter 36 may be installed or accessible by the client computing device 24 as part of the WBF, which also includes a client biometric service 28. The request may be transmitted by the client biometric service 28 and received by a client engine wrapper 12. The request may include user data, biometric indicia, and other information such as a specified engine adapter. The request may be forwarded by the client engine wrapper 12 to the client engine adapter 36.

Referring to step 304, the client engine adapter 36 determines if a biometric template is included in the request.

Referring to step 306, if the biometric template is not included in the request, then a biometric template associated with the user data is generated by the client engine adapter 36.

Referring to step 308, the biometric template is transmitted from the client engine adapter 36 to the client engine wrapper 12.

Referring to step 310, the client engine wrapper 12 transmits the biometric template to a client storage adapter 32.

Referring to step 312, the biometric template is stored in a client database 34 by the client storage adapter 32.

Referring to step 314, the client engine wrapper 12 transmits the biometric template to a server component 22, that is part of a server subsystem 14.

Referring to step 316, the server component 22 transmits the biometric template to a server storage adapter 18.

Referring to step 318, the biometric template is stored in a server database 20 by the server storage adapter 18.

Figure 5:
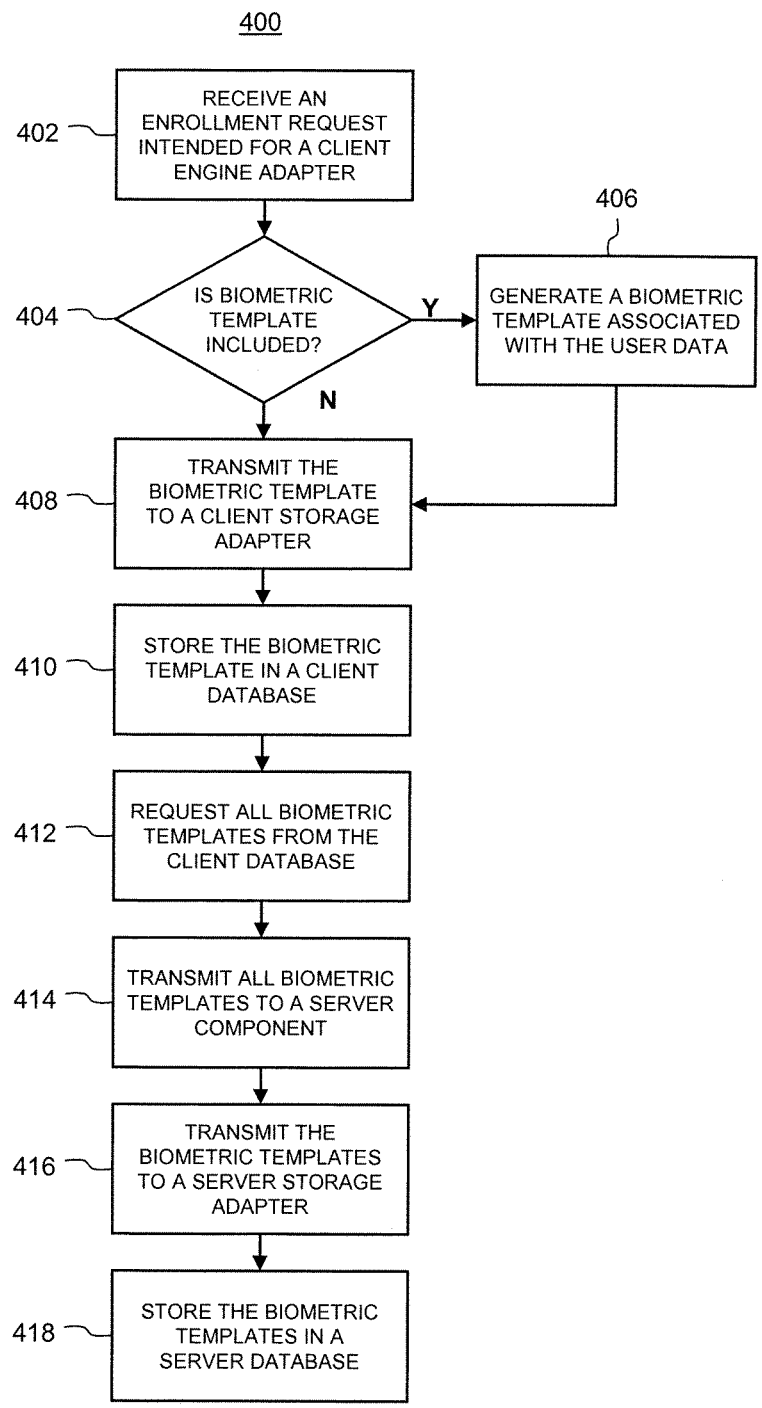
FIG. 5 is a flow diagram of at least some steps of a third method for enrolling a user using the enterprise biometric authentication system.

Steps of a third embodiment of a method 400 for enrolling a user utilizing the enterprise biometric authentication system 10 with a network of client computing devices 24 that are executing the Windows® 7 operating system including the Windows® Biometric Framework (WBF) in accordance with various embodiments of the present invention are illustrated in FIG. 5. The steps may be performed in the order shown in FIG. 5, or they may be performed in a different order. Furthermore, some steps may be performed concurrently as opposed to sequentially. In addition, some steps may be optional.

Referring to step 402, an enrollment request is received that is intended for a client engine adapter 36. The client engine adapter 36 may be installed or accessible by the client computing device 24 as part of the WBF, which also includes a client biometric service 28. The request may be transmitted by the client biometric service 28 and received by a client engine wrapper 12. The request may include user data, biometric indicia, and other information such as a specified engine adapter. The request may be forwarded by the client engine wrapper 12 to the client engine adapter 36.

Referring to step 404, the client engine adapter 36 determines if a biometric template is included in the request.

Referring to step 406, if the biometric template is not included in the request, then a biometric template associated with the user data is generated by the client engine adapter 36.

Referring to step 408, the biometric template is transmitted from the client engine adapter 36 to a client storage adapter 32. The biometric template may pass through the client engine wrapper 12 and a client biometric service 28 in traveling from the client engine adapter 36 to the client storage adapter 32.

Referring to step 410, the biometric template is stored in a client database 34 by the client storage adapter 32.

Referring to step 412, the client engine wrapper 12 requests all of the biometric templates stored in the client database 34.

Referring to step 414, all of the biometric templates are transmitted from the client engine wrapper 12 to a server component 22.

Referring to step 416, all of the biometric templates are transmitted from the server component 22 to a server storage adapter 18.

Referring to step 418, all of the biometric templates are transmitted from the server storage adapter 18 to a server database 20. In various embodiments, a server engine adapter 16 may determine the scan date for each of the biometric templates so that the most recent biometric template for each user is stored in the server database 20.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A non-transitory computer-readable storage medium encoded with code segments for authenticating a user to be implemented with a network of client computing devices, the computer-readable medium comprising:

a code segment executable by a client computing device for modifying a registry set to identify a client engine adapter as a client engine wrapper, the client engine adapter being software configured to perform a biometric authentication, and the client computing device being previously able to perform biometric authentication and unable to transmit a biometric authentication request to a server component;

a code segment executable by the client computing device for receiving a biometric authentication request including user data or credential information with the client engine wrapper from a client biometric service intended for the client engine adapter;

a code segment executable by the client computing device for determining whether the server component is available with the client engine wrapper;

a code segment executable by the client computing device if the server component is available for transmitting the biometric authentication request with user data or credential information to the server component from the client engine wrapper;

a code segment executable by a server subsystem if the server component is available for retrieving a stored biometric template associated with the user data from a server database;

a code segment executable by the server subsystem if the server component is available for performing an authentication with a server engine adapter;

a code segment executable by the server subsystem if the server component is available for transmitting an authentication result to the client engine wrapper;

a code segment executable by the client computing device if the server component is not available for retrieving a stored biometric template associated with the user data from a client database; and a code segment executable by the client computing device if the server component is not available for performing an authentication with the client engine adapter.

2. The computer-readable storage medium of claim 1, further comprising a code segment executable by the client computing device for transmitting the authentication result from the client engine wrapper to the client biometric service.

3. The computer-readable storage medium of claim 1, further comprising a code segment executable by the server subsystem for transmitting a biometric template associated with the user data to the client engine wrapper.

4. The computer-readable storage medium of claim 3, further comprising a code segment executable by the client computing device for storing the biometric template in the client database.

5. The computer-readable storage medium of claim 1, further comprising a code segment executable by the server subsystem for transmitting the request from the server component to the server engine adapter.

6. The computer-readable storage medium of claim 1, wherein the authentication includes comparing a captured biometric template with the stored biometric template.

7. The computer-readable storage medium of claim 1, wherein the authentication includes comparing a captured biometric template with a plurality of stored biometric templates.

8. A method for authenticating a user to be implemented with a network of client computing devices, the method comprising the steps of:

modifying a registry set of each client computing device to identify a client engine adapter as a client engine wrapper, the client engine adapter being software configured to perform a biometric authentication, and the client computing device being previously able to perform biometric authentication and unable to transmit a biometric authentication request to a server component;

receiving a biometric authentication request including user data or credential information with the client engine wrapper from a client biometric service intended for the client engine adapter;

determining whether the server component is available with the client engine wrapper;

transmitting the biometric authentication request with user data or credential information to the server component from the client engine wrapper if the server component is available;

retrieving a stored biometric template associated with the user data from a server database if the server component is available;

performing an authentication with a server engine adapter if the server component is available;

transmitting an authentication result to the client engine wrapper if the server component is available;

retrieving a stored biometric template associated with the user data from a client database if the server component is not available; and performing an authentication with the client engine adapter if the server component is not available.

9. The method of claim 8, further including the step of transmitting the authentication result from the client engine wrapper to the client biometric service.

10. The method of claim 8, further including the step of transmitting a biometric template associated with the user data to the client engine wrapper.

11. The method of claim 10, further including the step of storing the biometric template in the client database.

12. The method of claim 8, further including the step of transmitting the request from the server component to the server engine adapter.

13. The method of claim 8, wherein the authentication includes comparing a captured biometric template with the stored biometric template.

14. The method of claim 8, wherein the authentication includes comparing a captured biometric template with a plurality of stored biometric templates.

* * * * *